United States Patent

Carn et al.

[11] 4,174,127
[45] Nov. 13, 1979

[54] MULTIPORT PIGGABLE FLUID SWIVEL

[75] Inventors: William R. Carn, Naperville, Ill.; James L. Carothers, Ponca City, Okla.

[73] Assignee: Chicago Bridge & Iron Company, Oak Brook, Ill.

[21] Appl. No.: 894,498

[22] Filed: Apr. 7, 1978

[51] Int. Cl.² ............................................... F16L 27/08
[52] U.S. Cl. .............................. 285/190; 15/104.06 R; 285/136; 285/281; 285/93
[58] Field of Search ...................... 15/104.05, 104.06 R; 285/136, 190, 98, 93, 134, 272, 273, 274, 275, 276, 277, 278, 279, 280, 281, 282; 9/8 P; 141/387

[56] References Cited

U.S. PATENT DOCUMENTS

| | | | |
|---|---|---|---|
| 3,026,129 | 3/1962 | Courtot et al. | 285/272 X |
| 3,351,360 | 11/1967 | Follou | 285/190 X |
| 3,698,433 | 10/1972 | Dobler | 285/136 X |
| 3,838,718 | 10/1974 | Flory et al. | 285/136 X |
| 4,052,090 | 10/1977 | Stafford | 285/136 X |
| 4,065,154 | 12/1977 | Leroy | 285/136 |

Primary Examiner—Dave W. Arola
Attorney, Agent, or Firm—Merriam, Marshall & Bicknell

[57] ABSTRACT

A multiport piggable fluid-swivel comprising a first member having a first face, a second member having a second face adjoining and mating with the first face of the first member, the first face and the second face being positioned to rotate relative to each other about a common axis, a fluid conduit defined by a first raceway in the first face and a second raceway in the second face opposite the first raceway, an inlet conduit communicating with the fluid conduit and directed thereto at an angle so as to permit a pipeline pig to travel from the inlet conduit to the fluid conduit, an outlet conduit communicating with the fluid conduit, and a pipeline pig guide means extending from the fluid conduit to the outlet conduit to direct a pipeline pig from the fluid conduit to the outlet conduit.

17 Claims, 9 Drawing Figures

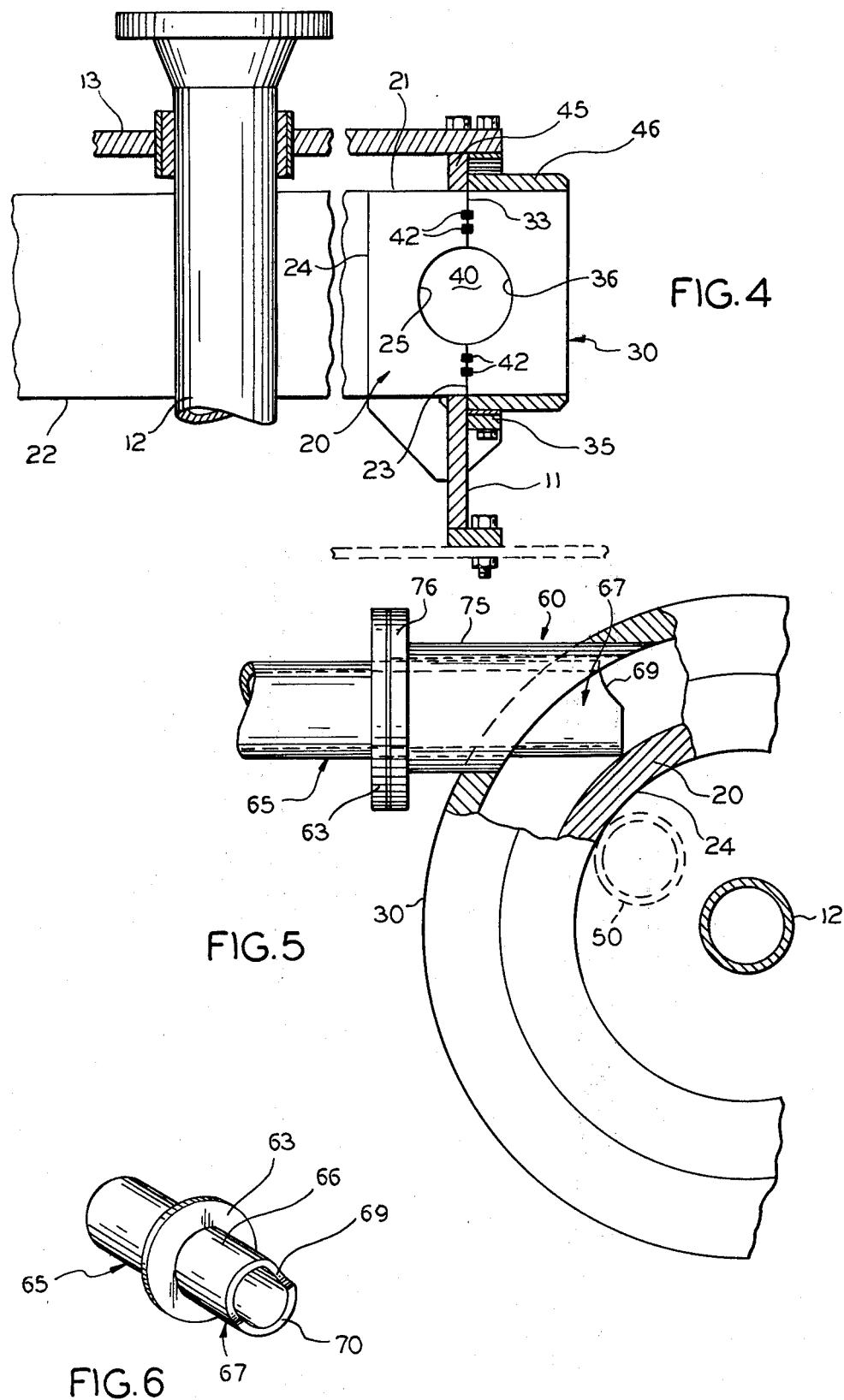

MULTIPORT PIGGABLE FLUID SWIVEL

This invention relates to a rotary or swivel joint for fluid flow. More particularly, the invention is concerned with a fluid-swivel which is piggable and can be used, for example, in loading and unloading a tanker offshore.

The loading and unloading of ocean-going tankers moored at offshore locations has become common. Many such moorings comprise a fixed or buoyant offshore terminal to which the tanker is secured by a suitable attachment which permits the vessel to swing in a complete circle about the terminal in response to the forces of wind, sea currents and tide. See U.S. Pat. Nos. 3,074,082; 3,077,615; 3,817,355 and 3,614,869. One or more conduits leading from the terminal to the tanker permit the tanker to be loaded or unloaded with a variety of liquids, including crude oil.

In order to permit the tanker to swing around the terminal, each conduit must be equipped with a swivel joint. Swivel joints of various types are known in the art. See U.S. Pat. Nos. 4,052,090; 3,698,433; 3,614,869; 3,430,670; 3,351,360; 3,082,440 and 2,894,268.

Crude oils are widely loaded and unloaded through fluid-swivels on offshore terminals. Many of the crude oils contain solid materials, such as wax or asphalt, which stick to the walls of the pipes feeding oil to and from the fluid-swivel, as well as in the conduits in the fluid swivel itself. Unless these solid deposits are removed, the effective internal diameter of the pipes and fluid-swivel will be reduced so much that fluid flow is seriously impeded, even to the point of total blockage. It is customary in the oil industry to force a pig through pipelines to remove solids deposited in them. However, present fluid-swivels and associated piping are not designed to be piggable, and will not permit a pig to travel through, so that cleaning them of deposits involves a costly and time consuming disassembly and reassembly operation. There is thus a need for a piggable fluid-swivel.

According to the invention, there is provided a piggable fluid-swivel comprising a first member having a first face, a second member having a second face adjoining and mating with the first face of the first member, the first face and the second face being positioned to rotate relative to each other about a common axis, a fluid conduit defined by a first raceway in the first face and a second raceway in the second face opposite the first raceway, an inlet conduit communicating with the fluid conduit and directed thereto at an angle so as to permit a pipeline pig to travel from the inlet conduit to the fluid conduit, an outlet conduit communicating with the fluid conduit, and a pipeline pig guide means extending from the fluid conduit to the outlet conduit to direct a pipeline pig from the fluid conduit to the outlet conduit. The guide means thus prevents the pig from traveling in an endless path in the fluid conduit, or back to the inlet conduit.

The fluid-swivel can take several forms which are related structurally. Thus, the first member can be a drum and the second member can be a ring which surrounds the drum. The fluid conduit can be partially in the ring and partially in the drum. The fluid-swivel can also be formed of two plates, one to top of the other with the fluid conduit partially in each plate. Structurally intermediate these two embodiments is a third embodiment in which the first and second faces of the members are matching conical surfaces which contain raceways defining the fluid conduit. Although the drum and ring mating walls may be sloped or conical sections, it is preferable to have the mating walls parallel to the drum and ring axis as circular cylindrical surfaces. Regardless of the shape of the faces, a seal is generally located on each side of the liquid conduit to restrain liquid flow between the mating or matching faces.

Both the inlet and outlet conduits are desirably positioned as close as practical to be tangential to the fluid conduit so as to facilitate entry of a pipeline pig into and out of the fluid conduit in the fluid swivel.

The guide means can include a portion which is telescoped into the fluid conduit and a deflector portion which is positioned in, and extends close to the surface of, the fluid conduit. The guide means desirably is removable from the fluid swivel through the outlet conduit with the first and second members in operable position.

The inlet conduit is advisably placed in communication with the fluid conduit through the first member, and the outlet conduit is placed in communication with the fluid conduit through the second member. A useful fluid-swivel requires that either the first or second member be stationary and that the other member be rotatable.

The fluid conduit is most suitably shaped like a torus with each raceway constituting one-half of the torus. Also, the inlet and outlet conduits are preferably circular in section and have a diameter substantially the same as the diameter of the fluid conduit or torus. This facilitates movement of a pig into and out of the fluid conduit.

The invention will be described further in conjunction with the attached drawings, in which:

FIG. 4 is a vertical radial sectional view, partly broken away, through one side of the fluid swivel shown in FIGS. 1 to 3;

FIG. 5 is a plan view, with part in section and part broken away, of the fluid-swivel shown in FIGS. 1 to 4 and outlet conduit with guide means therein;

FIG. 6 is an isometric view of the guide means shown in FIG. 5;

So far as is practical, the same elements or parts which appear in the different views comprising the drawings will be identified by the same numbers.

Figure 1:
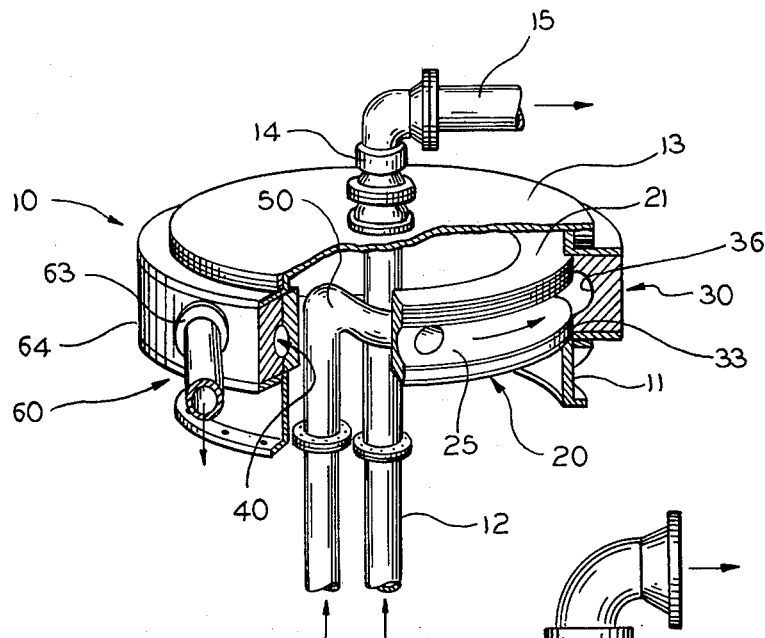
FIG. 1 is an isometric view, partially broken away, of one embodiment of fluid-swivel provided by the invention.
Figure 2:
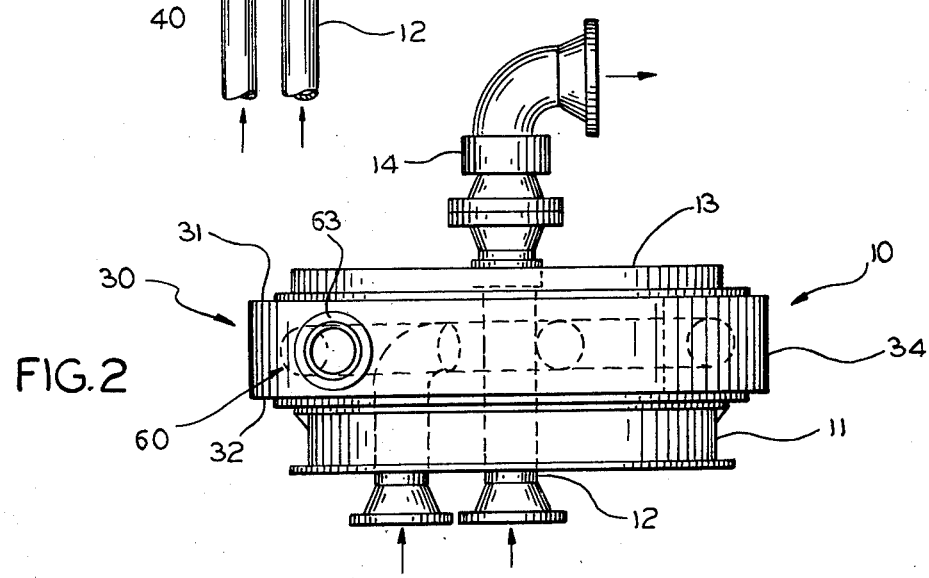
FIG. 2 is an elevational view of the fluid-swivel shown in FIG. 1.
Figure 3:
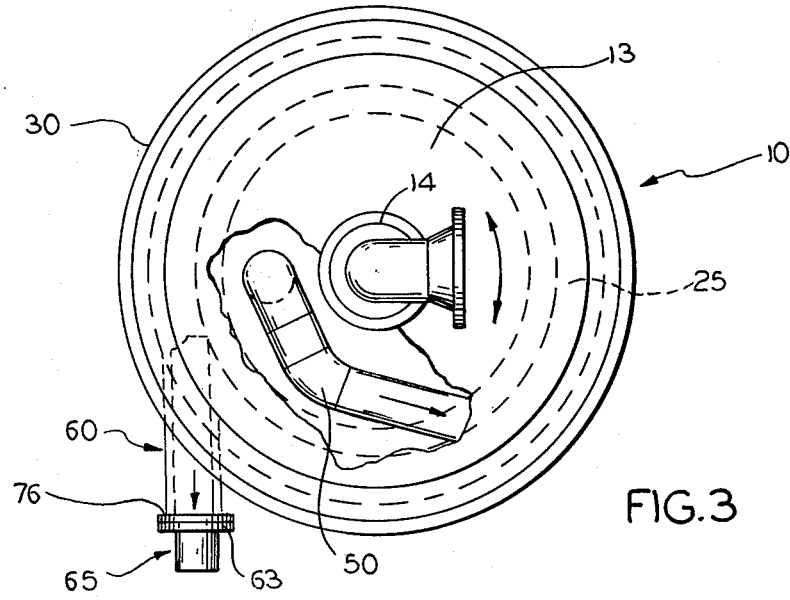
FIG. 3 is a plan view of the fluid-swivel shown in FIGS. 1 and 2.

The fluid-swivel 10 embodiment of FIGS. 1 to 6 is mounted on a support base 11 which can be located on an offshore tanker loading or unloading terminal which permits a tanker moored to it to rotate 360°. A centrally located pipe 12 extends through cover 13 to a conventional swivel 14 in communication with outlet pipe 15, thereby providing a first fluid flow line for loading and/or unloading a tanker moored to rotate 360°. The fluid-swivel 10, however, provides an additional means by which the same or another tanker similarly moored can be loaded or unloaded. However, the centrally located pipe 12 could be an electric line, electric swivel, a cable, a hawser, or any other useful device which is advantageously placed on the center line, and thus creates a need for an off-center, piggable swivel. Furthermore, by axially stacking the fluid-swivel of this invention one above the other, three or more fluid flow lines can be provided to load or unload rotatably moored ships, particularly tankers.

The fluid-swivel 10 has a stationary drum 20 fixedly joined to support base 11. Drum 20 has parallel top and bottom surfaces 21 and 22, an outer peripheral vertical circular face or wall 23 and an inner vertical circular face or wall 24.

Raceway 25 is located in, and extends completely around, the circumference of drum face or wall 23. The raceway 25 is semi-circular in radial vertical section through the drum with the diameter of the raceway located in the surface of drum face or wall 23.

Ring 30 is coaxially positioned around drum 20. Ring 30 has top and bottom spaced-apart horizontal surfaces 31 and 32, an internal vertical circular face or wall 33 and an external vertical circular face or wall 34. Ring 30 is rotatably supported by flange 35 mounted at the top of support base 11. The ring 30 internal wall 33 fits in mating contact with drum external wall 23. Raceway 36 is located in, and extends completely around, the ring internal face or wall 33. Raceway 36 is semi-circular in radial vertical section through ring 30 with the diameter of the raceway located in ring face or wall 33. The ring raceway 36 and the drum raceway 25 will be precisely opposite each other and together they form a circular fluid conduit 40 circular in vertical, radial cross-section through which a pig can travel unobstructed. The fluid conduit 40 as shown constitutes a torus.

Seals 42 (shown schematically) prevent or restrain fluid flow between the mating drum and ring faces or walls 23 and 33 and out of the fluid-swivel.

As shown in FIG. 4, the cover 13 has a downwardly extending flange 45 which is joined to the top 21 of drum 20. Outwardly projecting flange 46 is vertically displaceable to hold ring 30 in a suitable mating position with drum 20. Because of the large size of ring 30 and its great weight, suitable bearings, not shown, would be used between flanges 35 and 46 and the top and bottom surfaces of ring 30 to facilitate rotation of the ring.

The fluid-swivel 10 of FIGS. 1 to 6 has an inlet conduit 50 which communicates through drum 20 with the fluid conduit 40 at an angle which facilitates travel of a pipeline pig into fluid conduit 40. In addition, the fluid-swivel 10 has an outlet conduit 70 communicating through ring 30 with the fluid conduit 40 at an angle which facilitates travel of a pipeline pig into fluid conduit 40. A tangential arrangement of the inlet and outlet conduits relative to fluid conduit 40 is especially suitable for pig movement in and out of the fluid conduit.

To keep a pipeline pig which is fed by inlet conduit 50 to a fluid conduit 40 from continuing in an endless path in fluid conduit 40, or from returning to inlet conduit 50, a guide means 65 is positioned in the fluid-swivel 10 to extend from the fluid conduit 40 to the outlet conduit 60. The guide means 65 shown in FIGS. 5 and 6 comprises a straight tube 66 having a flange 63 joined thereto. The tube 66 has a pig deflector 67 formed by cutting away the tube front end portion 69.

The outlet conduit 60 has a tube 75 joined to an outlet port in ring 34 in communication with fluid conduit 40. Flange 76 is mounted on the end of tube 75. The front end of tube 66 of guide means 65 is inserted into tube 75 and flanges 67 and 76 are separably joined together, such as by bolts not shown. The front end of guide means 65 is so positioned and dimensioned that the deflector 67 extends into fluid conduit 40 and the front end face 70 nests by the raceway 25 in drum 20. None of the wall of tube 66 beyond lateral cut 69 should extend into the fluid conduit 40 since that could obstruct movement of a pipeline pig into tube 66.

The deflector 67 serves to guide a pig out irrespective of its location with respect to the inlet conduit 50. For maximum pigging effect, however, the outlet and the pig deflector should be located as close behind the inlet as is possible during a pigging operation to thereby require the pig to have the longest travel route in fluid conduit 40. Key marks can be placed on the drum 20 and ring 30 for such alignment prior to pigging. It should also be noted that the deflector 67 exerts a scraping action on inner raceway 25 when ring 30 rotates and thus helps to keep fluid conduit 40 partially open.

At such time as it becomes necessary to disassemble the fluid-swivel, the guide means 65 is first removed to make possible vertical lifting of ring 30 from around drum 20. It is possible, however, to permanently mount the deflector by making ring 30 in two equal semicircular parts which can be bolted or otherwise joined together at their vertically faced ends.

Figure 7:
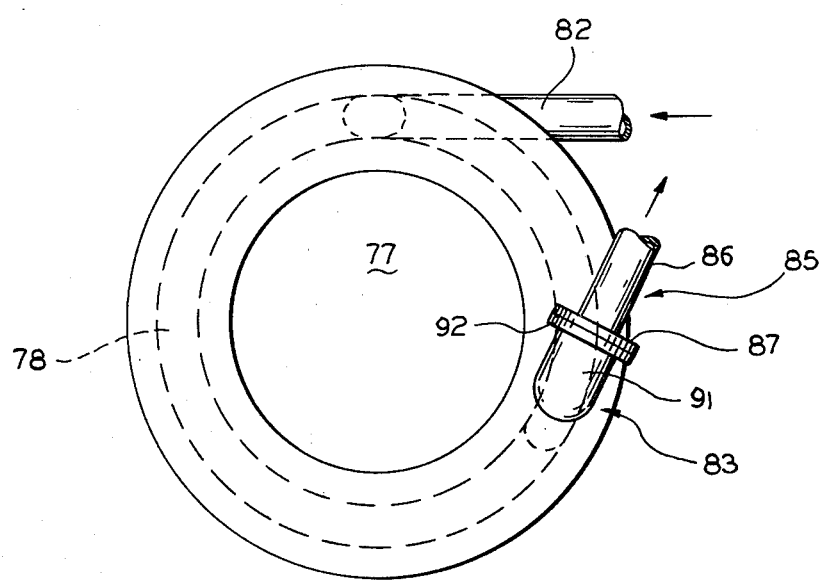
FIG. 7 is a plan view of a second embodiment of fluid-swivel in which two horizontal plates are used.
Figure 8:
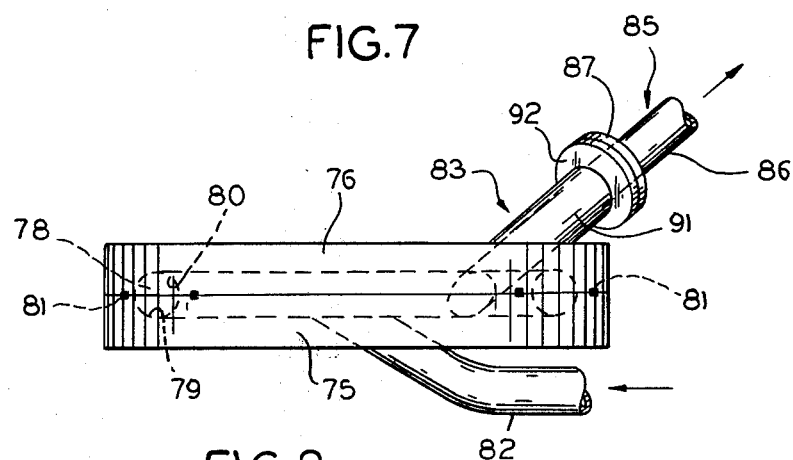
FIG. 8 is an elevational view of the fluid-swivel shown in FIG. 7.
Figure 9:
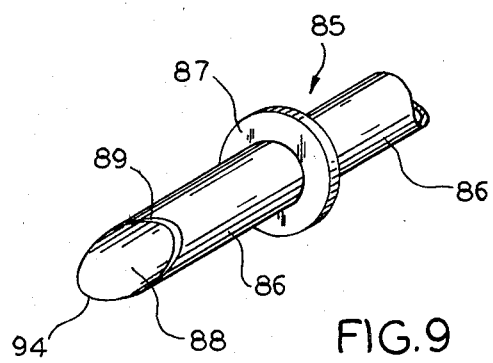
FIG. 9 is an isometric view of the pig guide means in the fluid-swivel shown in FIGS. 8 and 9.

FIGS. 7 to 9 illustrate a second embodiment of fluid-swivel provided by the invention. In this embodiment, the first member is horizontal plate 75 and the second member is horizontal plate 76. Each of plates 75 and 76 is shaped like a circular disc with horizontal top and bottom parallel surfaces and a hole 77 in the center. Fluid conduit 78 is defined by two matching but opposing raceways. One raceway 79 is in the top of plate 75 and the other raceway 80 is in the bottom of plate 76. Seals 81 (shown schematically) are positioned on each side of fluid conduit 78 to prevent leakage. Clamp means, not shown, is used to hold plates 75 and 76 rotatably together.

Inlet conduit 82 communicates smoothly with fluid conduit 78 and outlet conduit 83 also communicates smoothly with fluid conduit 78. As a result, the fluid conduit 73 has a smooth bore, circular in lateral cross-section, through which a pig can move unobstructed.

To keep a pipeline pig which is fed by inlet conduit 82 to fluid conduit 78 from continuing in an endless path, or from returning to inlet conduit 82, a guide means 85 is positioned in the fluid-swivel to extend from the fluid conduit 78 to the outlet conduit 83. The guide means 85 shown in FIGS. 7 to 9 comprises straight tube 86 having a flange 87 joined thereto. The tube 86 has a pig deflector 88 formed by cutting away the tube front end portion 89 at a sharp angle.

The outlet conduit 83 has a tube 91 joined to an outlet port in plate 76 in communication with fluid conduit 78. Flange 92 is mounted on the end of tube 91. The front end of tube 86 of guide means 85 is inserted into tube 91 and flanges 87 and 92 are separably joined together, such as by bolts not shown. The front end of guide means 85 is so positioned and dimensioned that the deflector 88 extends into fluid conduit 78 and the front end face 94 nests by the raceway 79 in plate 75. Generally, none of the wall of tube 86, other deflector 88, should extend into the fluid conduit 78 since that could obstruct movement of a pipeline pig into tube 86.

The described fluid-swivel embodiments can be used to convey liquids, gases and liquefied gases such as crude oil, fuel oil, natural gas and liquefied natural gas.

The foregoing detailed description has been given for clearness of understanding only, and no unnecessary limitations should be understood therefrom as modifications will be obvious to those skilled in the art.

What is claimed is:

1. A fluid-swivel comprising:
   a first member having a first face,
   a second member having a second face adjoining and mating with the first face of the first member,
   means operatively positioning and holding the first member and the second member to rotate relative to each other about a common axis and with the first face and second face positioned to rotate relative to each other in operative arrangement,
   a fluid conduit defined by a first raceway in the first face and a second raceway in the second face opposite the first raceway,
   sealing means preventing fluid flow between the first face and the second face and thereby out of the fluid-swivel,
   an inlet conduit communicating with the fluid conduit and directed thereto at an angle so as to permit a pipeline pig to travel from the inlet conduit to the fluid conduit,
   an outlet conduit communicating with the fluid conduit, and
   a pipeline pig guide means extending from the fluid conduit to the outlet conduit to direct a pipeline pig from the fluid conduit to the outlet conduit.

2. A fluid-swivel according to claim 1 in which the outlet conduit is positioned approximately tangentially to the fluid conduit.

3. A fluid swivel according to claim 1 in which the guide means includes a portion which is telescoped into the fluid conduit and a deflector portion which is positioned in, extends to, and mates with the surface of the fluid conduit.

4. A fluid-swivel according to claim 3 in which the guide means is removable from the fluid-swivel through the outlet conduit with the first and second members in operable position.

5. A fluid-swivel according to claim 1 in which the fluid conduit is a torus.

6. A fluid-swivel according to claim 5 in which the first face and the second face are each planar.

7. A fluid-swivel according to claim 5 in which the first face and the second face are each cylindrical.

8. A fluid-swivel according to claim 1 in which the inlet conduit communicates with the fluid conduit through the first member, and the outlet conduit communicates with the fluid conduit through the second member.

9. A fluid-swivel according to claim 1 in which the sealing means is a seal is located on each side of the fluid conduit to restrain fluid flow between the first face and the second face.

10. A fluid-swivel according to claim 5 in which the inlet and outlet are circular and have a diameter substantially the same as the diameter of the fluid conduit.

11. A fluid-swivel according to claim 1 in which the means operatively positioning and holding the first member and the second member to rotate relative to each other permits the outlet conduit to communicate with the fluid conduit close behind the inlet conduit communication with the fluid conduit so that during a pigging operation the pig travels the longest route in the fluid conduit before the pig guide means directs the pig from the fluid conduit to the outlet conduit.

12. A fluid-swivel comprising:
    a drum having a peripheral circular wall,
    a raceway in, and extending completely around, the circumference of the drum wall,
    a ring coaxially positioned around the drum and having an internal circular wall in mating contact around the drum wall,
    means operatively positioning and holding the drum and the ring to rotate relative to each other about a common axis and with the drum wall and the ring wall positioned to rotate relative to each other in operative arrangement,
    one of the drum and the ring being in stationary position and the other being rotatable,
    a raceway in, and extending completely around, the ring internal wall,
    the raceways in the drum and the ring being opposite and matching each other thereby forming a fluid conduit circular in radial vertical section through the drum and ring,
    sealing means preventing fluid flow between the drum wall and the ring wall and thereby out of the fluid-swivel,
    an inlet conduit communicating with the fluid conduit and directed thereto at an angle so as to permit a pipeline pig to travel from the inlet conduit to the fluid conduit,
    an outlet conduit communicating with the fluid conduit, and
    a pipeline pig guide means extending from the fluid conduit to the outlet conduit to direct a pipeline pig from the fluid conduit to the outlet conduit.

13. A fluid-swivel according to claim 10 in which the inlet conduit communicates approximately tangentially with the fluid conduit, and the outlet conduit communicates approximately tangentially with the fluid conduit but in a direction opposite to the inlet conduit.

14. A fluid-swivel according to claim 12 in which the drum and ring mating walls are parallel to the drum and ring axis.

15. A fluid-swivel according to claim 12 in which the sealing means is a seal is located on each side of the fluid conduit to restrain fluid flow between the mating drum and ring walls.

16. A fluid-swivel according to claim 12 in which the inlet and outlet have a diameter substantially the same as the diameter of the fluid conduit.

17. A fluid-swivel according to claim 12 in which the means operatively positioning and holding the first member and the second member to rotate relative to each other permits the outlet conduit to communicate with the fluid conduit close behind the inlet conduit communication with the fluid conduit so that during a pigging operation the pig travels the longest route in the fluid conduit before the pig guide means directs the pig from the fluid conduit to the outlet conduit.

* * * * *

UNITED STATES PATENT AND TRADEMARK OFFICE
CERTIFICATE OF CORRECTION

PATENT NO. : 4,174,127
DATED : November 13, 1979
INVENTOR(S) : William R. Carn and James L. Carothers It is certified that error appears in the above–identified patent and that said Letters Patent are hereby corrected as shown below:

Column 1, line 65, change "to top" to --on top--;
Column 4, line 66, change "other" to --or the--; Claims 9 and 15, line 2, change "seal is located" to --seal located--;
Claim 13, line 1, change "10" to --12--.

Signed and Sealed this

Nineteenth Day of February 1980

[SEAL]

Attest:

SIDNEY A. DIAMOND

Attesting Officer

Commissioner of Patents and Trademarks